T. R. PALMER.
PEDAL RUBBER FOR BICYCLE PEDALS.
APPLICATION FILED FEB. 12, 1919.
1,320,025.
Patented Oct. 28, 1919.
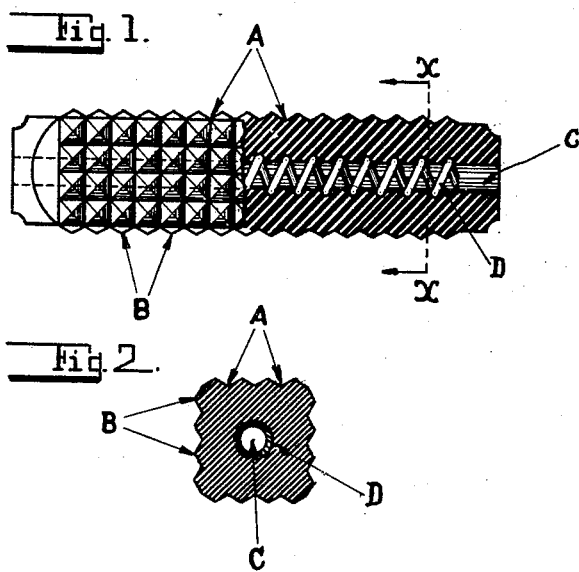

UNITED STATES PATENT OFFICE.

THERON R. PALMER, OF ERIE, PENNSYLVANIA.

PEDAL-RUBBER FOR BICYCLE-PEDALS.

1,320,025.  Specification of Letters Patent.  Patented Oct. 28, 1919.

Application filed February 12, 1919. Serial No. 276,484.

*To all whom it may concern:*

Be it known that I, THERON R. PALMER, a citizen of the United States, residing at Erie, in the county of Erie and State of Pennsylvania, have invented certain new and useful Improvements in Pedal-Rubber for Bicycle-Pedals; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to improvements in pedal-rubbers for bicycle pedals ordinarily made of rubber and mounted on a supporting rod secured in the pedal frame; as now usually made the pedal rubber has a central longitudinal opening therein, which fits on the supporting rod thereof and is clamped between the ears of the treadle thereby; and the rod being small it soon wears and enlarges the opening in the pedal rubber to such an extent that from the pressure applied by the foot upon it, tends to split and destroy it.

To overcome this difficulty I provide a central metallic bearing vulcanized into the pedal-rubber which bearing contacts with the supporting rod of the pedal-rubber so as to prevent the wearing away and splitting of the pedal-rubber by the pressure on its supporting rod, and thereby greatly increases the wearing qualities and durability of the pedal-rubber in operation.

The features of this invention are hereinafter fully set forth and described, and illustrated in the accompanying drawings, in which: Figure 1, shows my improved pedal-rubber partially in side elevation, and partially in central longitudinal section. Fig. 2, is a cross section of the same on the line *x—x* in Fig. 1.

In these drawings A indicates the body of the pedal-rubber made of vulcanized rubber and preferably provided with corrugations B, on the surface thereof in the usual manner; and C indicates the central longitudinal opening therein adapted to receive the rod of the bicycle pedal by which the pedal-rubber is clamped in place and supported.

In making my improved pedal-rubber I vulcanize therein a metallic bearing surrounding the opening C preferably consisting of a spirally wound sleeve of wire D, which preferably does not extend quite to the ends of the pedal-rubber, as clearly shown in Fig. 1. This spiral sleeve of metal D is secured in the pedal-rubber by vulcanizing it in place therein, so that it surrounds the opening C and contacts with the supporting rod on which the pedal-rubber is mounted and supported, whereby the supporting rod thereof is effectively prevented from wearing and cutting into the body of the pedal-rubber, thereby greatly increasing the life and durability thereof in operation.

Having described my invention so as to enable others to utilize the same what I claim as new and desire to secure by Letters-Patent is:

The combination of a bicycle pedal rubber having a central longitudinal opening therethrough for the supporting rod thereof, with a spiral wire sleeve surrounding said opening and contacting with and forming a bearing for the pedal rod, substantially as set forth.

In testimony whereof I affix my signature.

THERON R. PALMER.

Copies of this patent may be obtained for five cents each, by addressing the "Commissioner of Patents, Washington, D. C."